(12) United States Patent
Schubert et al.

(10) Patent No.: US 6,264,900 B1
(45) Date of Patent: *Jul. 24, 2001

(54) DEVICE FOR CARRYING OUT CHEMICAL REACTIONS USING A MICROLAMINAR MIXER

(75) Inventors: Klaus Schubert, Karlsruhe; Wilhelm Bier, Eggenstein-Leopoldshafen; Gerd Linder, Karlsruhe; Erhard Herrmann, Leverkusen; Bernd Koglin, Bergisch Gladbach; Thomas Menzel, Hilden; Christine Maul, Köln, all of (DE)

(73) Assignees: Bayer Aktiengesellschaft, Leverkusen; Forschungszentrum Karlsruhe GmbH, Karlsruhe, both of (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/068,322

(22) PCT Filed: Oct. 24, 1996

(86) PCT No.: PCT/EP96/04665

§ 371 Date: May 5, 1998

§ 102(e) Date: May 5, 1998

(87) PCT Pub. No.: WO97/17130

PCT Pub. Date: May 15, 1997

(30) Foreign Application Priority Data

Nov. 6, 1995 (DE) .............................................. 195 41 266

(51) Int. Cl.[7] ...................................................... B01F 5/00

(52) U.S. Cl. .......................... 422/224; 422/228; 366/144; 366/337; 366/340; 138/38; 165/109.1; 165/166

(58) Field of Search ..................................... 422/171, 211, 422/224, 228; 366/336, 337, 144, 340; 138/38; 165/109.1, 166

(56) References Cited

U.S. PATENT DOCUMENTS

| | | | |
|---|---|---|---|
| 4,198,168 | * | 4/1980 | Penn ..................................... 366/336 |
| 4,407,785 | * | 10/1983 | Pfefferle .............................. 413/659 |
| 4,793,247 | * | 12/1988 | Verweij ................................ 366/338 |
| 5,320,428 | * | 6/1994 | Streiff .................................. 366/337 |
| 5,380,088 | * | 1/1995 | Fleischli et al. ................... 366/162.1 |
| 5,803,600 | * | 9/1998 | Schubert et al. ..................... 366/144 |

FOREIGN PATENT DOCUMENTS

| | | |
|---|---|---|
| 1333531 | 10/1973 | (GB) . |
| 2073604 | 10/1981 | (GB) . |

* cited by examiner

Primary Examiner—Hien Tran
Assistant Examiner—Basia Ridley
(74) Attorney, Agent, or Firm—Norris McLaughlin & Marcus

(57) ABSTRACT

A microstructures lamellae mixer comprising a guide component for supplying fluids to be mixed to a mixing chamber, the guide component being composed of a plurality of foils which are layered one above the other and into which microchannels are incorporated such that separate fluids supplied to the guide component are formed into spatially separated microstreams which then emerge adjacent to each other in a mixing chamber.

5 Claims, 10 Drawing Sheets

——●—— Smooth jet nozzle
—-○-— Microstructure mixer (d = 0.07mm, b = 0.1mm)
—-■-— Microstructure lamellae mixer (d = 0.07mm, b = 4mm)

Fig. 8a
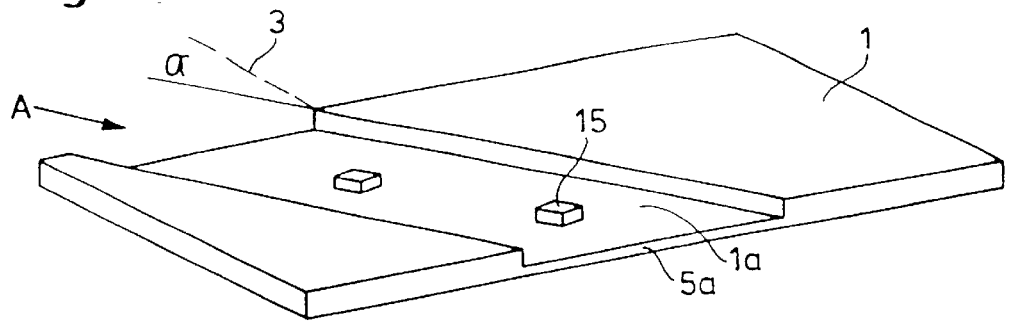
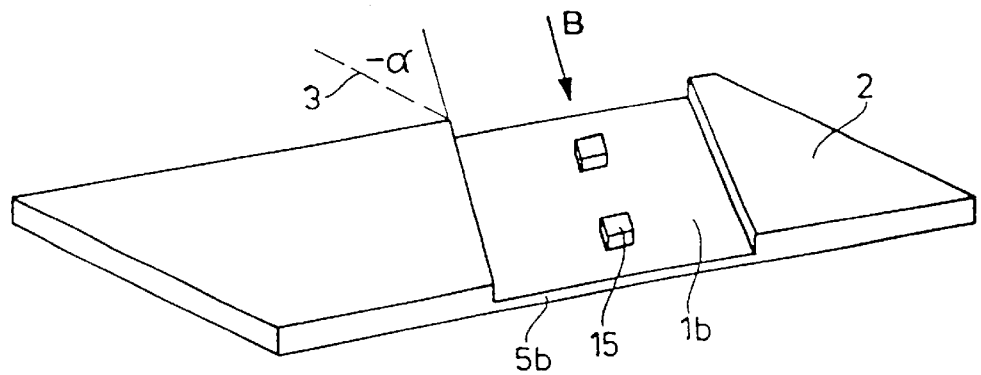
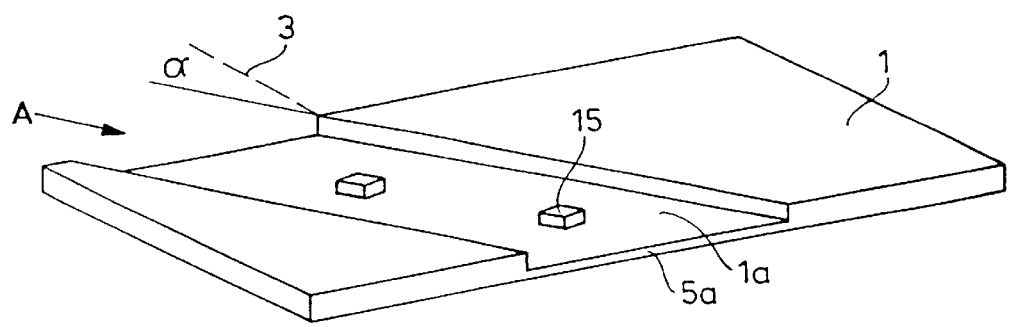
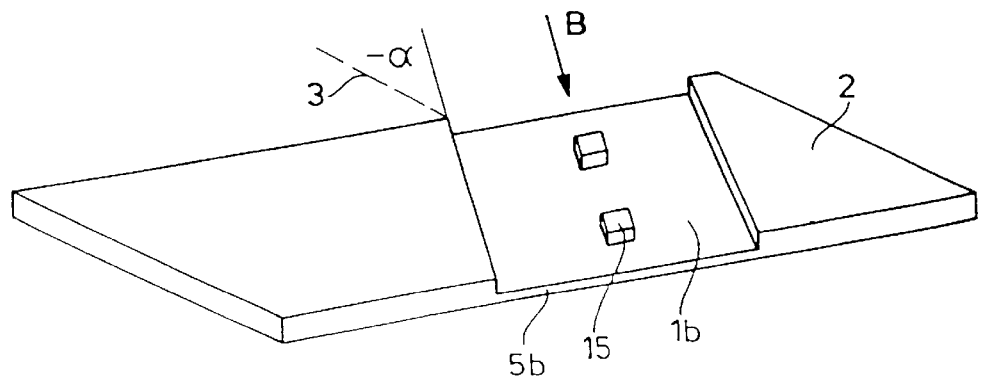

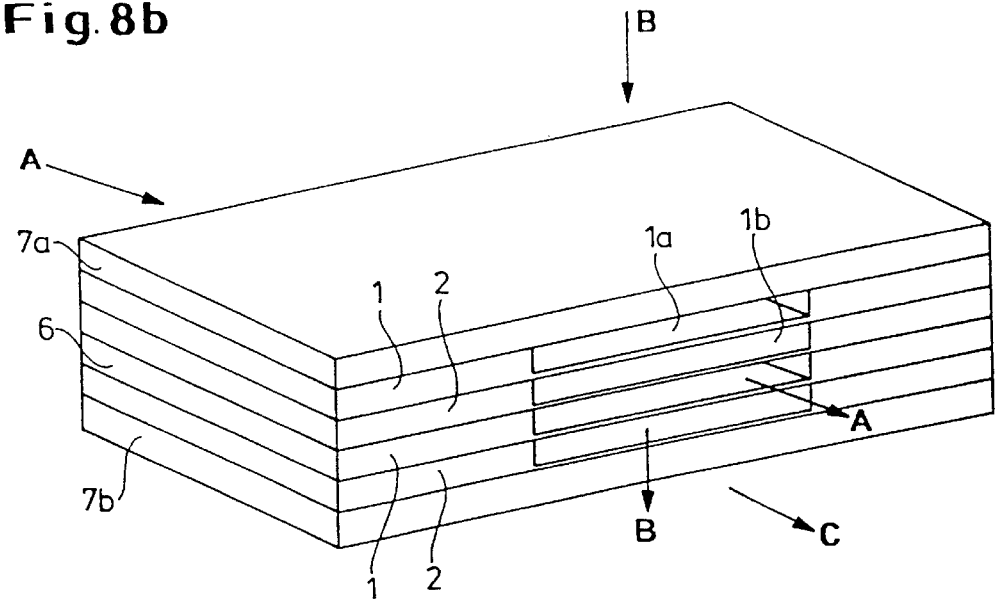
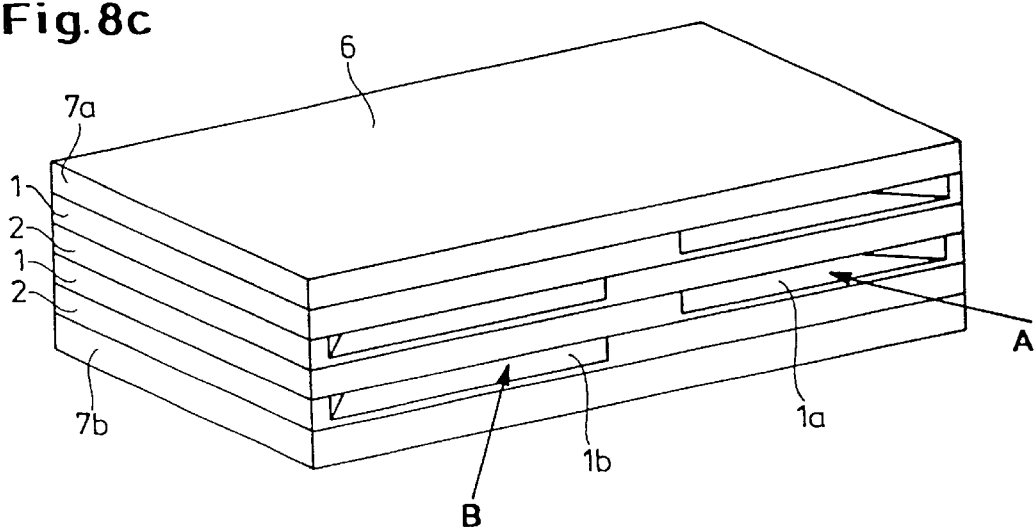

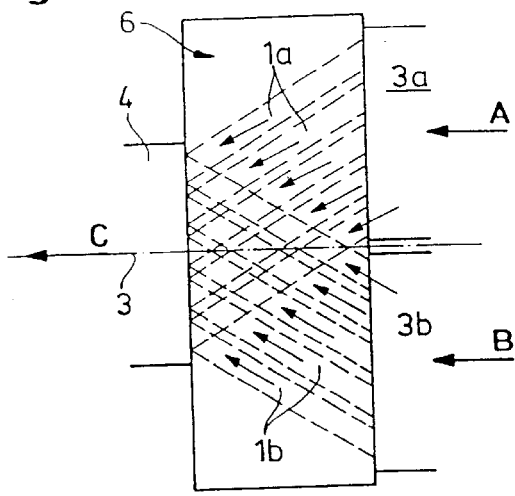
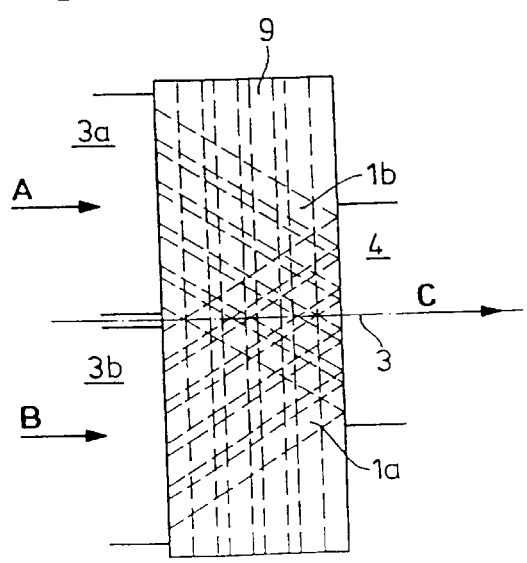
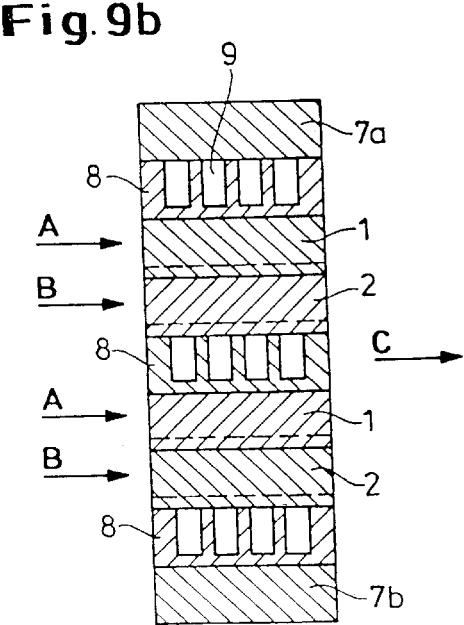

DEVICE FOR CARRYING OUT CHEMICAL REACTIONS USING A MICROLAMINAR MIXER

To carry out a chemical reaction in a continuous procedure, the reaction partners must be fed continuously to a chemical reactor and brought intimately into contact, i.e. mixed thoroughly, with the aid of a mixing element (mixer). A simple reactor is, for example, a tank with a stirrer as the mixing element. As a rule, several reactions, so-called main and side reactions, proceed in the reactor when the reactants come into contact. The aim of the process engineer here is to conduct the reactions and therefore also the mixing such that the highest possible yield of the desired product is achieved selectively.

The quality of the mixing and the influence of the mixing element on the yield of the desired product depends greatly here on the ratio of the rate of the chemical reaction, determined by the reaction kinetics, to the rate of mixing. If the chemical reactions are slow reactions, as a rule the chemical reaction is substantially slower than the mixing. The overall rate of reaction and the yield of desired product is then determined by the slowest step, that is to say the kinetics of the chemical reactions which proceed, and in addition by the global mixing properties (residence time distribution, macromixing) of the chemical reactor used. If the rates of the chemical reactions and the rate of mixing are of the same order of magnitude, complex interactions arise between the kinetics of the reactions and the local mixing properties, determined by the turbulence, in the reactor used and at the mixing element (micromixing). If the case occurs where the rates of the chemical reactions are substantially faster than the rate of mixing, the overall rates of the reactions which proceed and the yields are substantially determined by the mixing, i.e. by the local time-dependent speed and concentration field of the reactants, i.e. the turbulence structure in the reactor and at the mixing element [1].

BACKGROUND OF THE INVENTION

According to the prior art, a number of mixing elements are employed for carrying out fast reactions in a continuous procedure. A distinction may be made here between dynamic mixers, such as stirrers, turbines or rotor-stator systems, static mixers, such as Kenics mixers, Schaschlik mixers or SMV mixers, and jet mixers, such as nozzle mixers or T mixers [2–4].

For rapid mixing of starting substances in rapid reactions with undesirable secondary or side reactions, nozzle mixers are preferably employed.

In jet or nozzle mixers, one of the two starting components is atomized into the other components at a high flow rate (cf. FIG. 1). In this case, the kinetic energy of the stream (B) sprayed in is substantially dissipated behind the nozzle, i.e. is converted into heat by turbulent breakdown of the stream into eddies and further turbulent breakdown of the eddies into ever smaller eddies. The eddies contain the particular starting components, which are present side-by-side in the fluid balls (macromixing). A small degree of mixing by diffusion indeed occurs at the edges of these initially larger structures at the start of the turbulent breakdown of the eddies. However, complete mixing is achieved only when the breakdown of the eddies has progressed to the extent that, when eddy sizes of the order of magnitude of the concentration microdimension (Batchelor length) [5, 6] are reached, the diffusion is rapid enough for the starting components to be mixed completely with one another in the eddies. The mixing time required for complete mixing depends substantially on the specific energy dissipation rate, in addition to the substance data and the geometry of the apparatus.

The mixing processes in the mixers according to the prior art which are often used are in principle similar (in dynamic mixers and static mixers the eddies are also additionally divided mechanically, although as a rule with substantially lower specific energy dissipation rates). This means that in the mixers used according to the prior art, the time for breakdown of the eddies always elapses before complete mixing by diffusion. For very fast reactions, this means that either very high energy dissipation rates must be established, in order to avoid undesirable side and secondary reactions, or, in the case of reactions with even higher rates of reaction, the corresponding reactions are not carried out to the optimum, i.e. are carried out only with the formation of by-products or secondary products.

On the basis of this prior art, the object of the invention is to provide a process and a device with which mixing takes place rapidly and the formation of secondary products or by-products is suppressed or reduced. The achievement here must be that the educts are mixed homogeneously with one another so that, within the shortest time, local and time-related over-concentrations of the educts no longer occur. In the case of fluids which react chemically with one another, complete reaction of the fluids is to be achieved. If required, the heat of reaction should also be removed or supplied effectively and as rapidly as possible.

SUMMARY OF THE INVENTION

This object is achieved according to the invention by a process in which at least two educts A, B are divided in a microstructure mixer, by a system of slit-like microchannels (microslit channels) assigned to them, into spatially separate fluid lamellae, which then emerge with flow rates which are the same for the particular educt into a mixing/reaction space, each fluid lamella of an educt A being led into the mixing and reaction space in the immediate vicinity of a fluid lamella of another educt B, and the adjacent fluid lamellae mixing with one another by diffusion and/or turbulence. A microslit channel is understood here as meaning a rectangular microchannel having a depth d, its width b being >=10d (b/d>=10), preferably b>=20d (b/d>=20).

Laminar flow conditions for educts A, B are preferably maintained in the microslit channels. However, there is nothing against working with turbulent flows in the microslit channels, where appropriate.

An embodiment in which the fluid lamellae of educts A, B emerge into the mixing/reaction space in layers lying alternately one above the other or side by side has proved to be particularly suitable.

DETAILED DESCRIPTION

The geometry of the microstructure lamellae mixer is advantageously designed such that the thickness of the fluid lamellae d at the entry into the mixing/reaction space can be adjusted to a value between 10 μm and 1,000 μm, preferably between 10 μm and 100 μm. A thickness d which is of the order of magnitude of the concentration microdimension is preferably established, so that after exit from the microstructure mixer, micromixing of the components can take place rapidly by diffusion, without further eddy breakdown being necessary. The width b of the fluid lamellae or of the microslit channels via which the lamellae emerge from the microstructure lamellae mixer should be as wide as possible here, to keep the pressure loss in the mixer as low as possible by reducing the wall area per educt volume. The width b here can vary from values in the range of the order of 0.5 mm to high values in the range of several centimeters, and is substantially limited only by the mechanical stability of the structural component. A lowest possible thickness d of the fluid lamellae, and not the width b, is decisive here for the rate of mixing and therefore the mixing quality.

A further development of the process according to the invention comprises additionally feeding a fluid lamella of a temperature-controlled inert fluid, for example, for heating or cooling purposes, into the mixing/reaction space in the vicinity of a fluid lamella of an educt.

The process according to the invention is thus based on first dividing educt streams A, B convectively, by means of the microstructure lamellae mixer, into thin lamellae having a thickness d, which then mix with one another by diffusion and/or turbulence in the mixing/reaction space after their exit.

The task of the microstructure lamellae mixer here is to divide the educt streams convectively and to generate fine fluid lamellae having a characteristic thickness d, without the starting components coming into contact with one another within the mixer device. By having the same geometric dimensions (same cross-section and same length) for the microslit channels assigned to a particular educt, it is ensured that the fluid lamellae emerge with the same flow rates from all the channels assigned to a particular educt. If there are two educts A, B, the flow rates in the microslit channels are each the same as one another for an educt. However, it is entirely possible for the flow rates of the two educts (in relation to one another) to differ.

The device according to the invention enables the time taken for the turbulent eddy breakdown during mixing to be substantially saved, and as a result for the mixing operation to be substantially accelerated. By dividing the educt streams into thin fluid lamellae of thickness d within the microstructure, without the educt streams coming into contact with one another, and by homogeneous distribution of the educts at the exit from the microstructure, the mixing properties of virtually an ideal tube reactor are established. In the case of fast reactions, undesirable by-products or secondary products occur to a substantially lesser extent than in mixers according to the prior art. Fast reactions which have characteristic reaction times <10 s, and in particular <1 s, are therefore a main use. "Reaction time" is usually understood as meaning the half-life, i.e. the time after the start of the reaction after which the educt concentration has fallen to half the value.

A static microstructure lamellae mixer having at least one mixing chamber and a prior guide component for feeding in mixing or reaction fluids (educts) has proved to be a suitable device. The guide component here is composed of several plate-like elements layered one above the other, through which pass microchannels which run at an angle to the micromixer longitudinal axis, the channels of adjacent elements crossing without contact and opening into the mixing chamber. According to the invention, this device is characterized by the following features:

a) The plate-like elements comprise thin foils into which in each case individual or a system of closely adjacent slit-like microslit channels which run at alternating angles to the micromixer longitudinal axis is incorporated, so that when the foils are layered one above the other, in each case a series of closed channels for guiding the fluids to be mixed (educts A, B) is formed.

b) The microslit channels have a depth d<1,000 $\mu$m, preferably <100 $\mu$m, at wall thicknesses of the intermediate bridges and channel bases of <1,000 $\mu$m, preferably <100 $\mu$m, and a width which is at least 10 times, preferably 20 times, the depth d.

c) The microslit channels of adjacent foils diverge towards the fluid entry side of the micromixer such that the fluids to be mixed (educts A, B) can be fed in separately.

To improve the mechanical stability, pins or bridges which are permanently connected to the channel bases and support them against one another can be attached perpendicularly to the channel bases.

Alternatively, an intermediate foil is inserted between in each case two foils with the angled microslit channels which diverge towards the fluid entry side, this intermediate foil having microslit channels which run perpendicularly to the micromixer longitudinal axis and are used for passing a cooling or heating medium through.

According to another alternative, a micro-heat exchanger is connected to the mixing chamber. However, the mixing chamber itself can also be constructed as a micro-heat exchanger connected directly to the guide component.

With the device according to the invention, the fluids to be mixed are divided in turn and "in staggered form" into thin, adjacent fluid lamellae, which, when brought together on entry into the mixing chamber, fill up a common, correspondingly narrowly defined volume and as a result can mix thoroughly by the quickest and shortest route. The formation of extremely thin fluid lamellae allows a few hundred to thousand lamellae to lie one above the other or side by side over a height of 1 cm, and these fluid lamellae to be fed alternately through educt A and educt B.

The device according to the invention allows mixing of two or more fluids. If fluids which react chemically with one another (educts) are mixed, the heat of reaction thereby arising (exothermic reactions) or required (endothermic reactions) can be removed or supplied by the micro-heat exchanger connected to the device.

The following further advantages can be achieved by using the device according to the invention:

Improvement of the yield, selectivity and product quality in known reactions

Preparation of products with new property profiles (e.g. higher purities)

Miniaturization of reactors and mixers, if appropriate in combination with heat exchangers Improvement in the safety standard of exothermic reactions by reducing the hold-up and, where appropriate, by reducing the dimensions of the microslit channels below the quenching distance (improved ignition backfiring protection!).

Due to the slit-like design of the microchannels (channel width b>>channel depth d), the contact area between the fluid and channel wall is minimized. In the microstructure lamellae mixer, especially at a channel depth d<100 $\mu$m, this leads to significantly lower frictional pressure losses than in a microstructure mixer in which the width b of the microslit channels is of the order of magnitude of the depth d (approximately square cross-section).

By generating fluid lamellae in the device according to the invention instead of a relatively large number of fluid threads separated by intermediate walls, the backmixing which can occur in the intermediate region between the individual fluid threads directly on their entry into the mixing space due to a local eddy at the openings and therefore the formation of by-products are reduced.

The risk of blockages is furthermore reduced significantly compared with the micromixer with many approximately square microchannels.

BRIEF DESCRIPTION OF THE DRAWINGS

The invention is illustrated in more detail below with the aid of embodiment examples and drawings. In the drawings

FIGS. 5a and 5b show an embodiment in which the spatial arrangement of the fluid lamellae, which are assigned to educts A, B, on entry into the mixing/reaction space is characterized by layers lying alternately one above the other or side by side FIG. 8a shows several foils to be stacked, as structural elements for the microstructure lamellae mixer, with in each case one microslit channel per foil FIGS. 8b and 8c show two views of a guide component of foils according to FIG. 8a FIG. 8d shows a diagram of the flow pattern in a microstructure lamellae mixer FIGS. 9a and 9b show diagrams of a microstructure lamellae mixer with a guide component which can be cooled or heated

Figure 1:
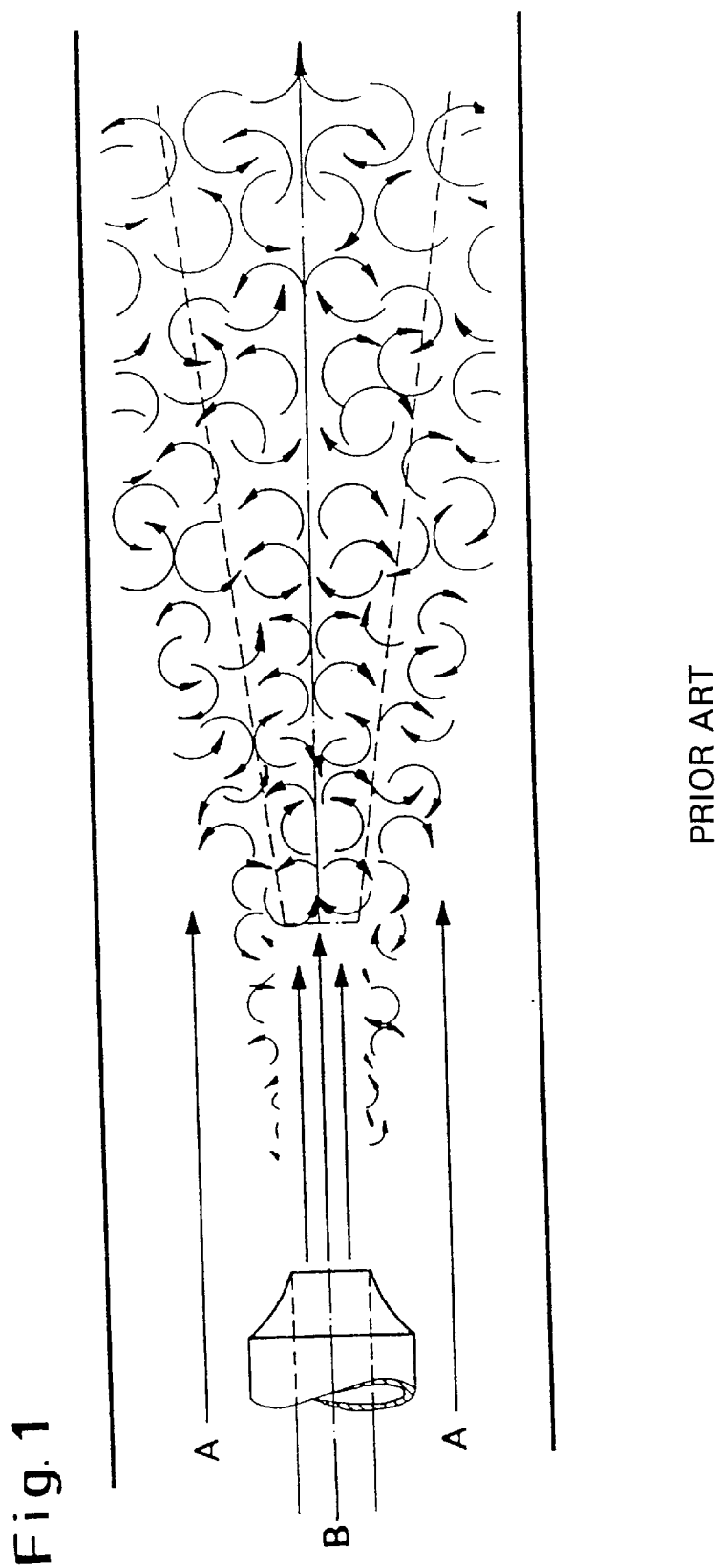
FIG. 1 shows mixing of two educts A, B in a smooth jet mixer or tube reactor (prior art)

According to FIG. 1, two educts A, B which react with one another are fed to a smooth jet mixer or smooth jet nozzle reactor according to the prior art. In this case, educt B is sprayed at a different flow rate into educt stream A, which is fed through the concentric annular space between the nozzle and the reactor wall. Intensive mixing (eddying) and an immediate start to the chemical reaction between educts or reactants A, B occur.

Figure 2:
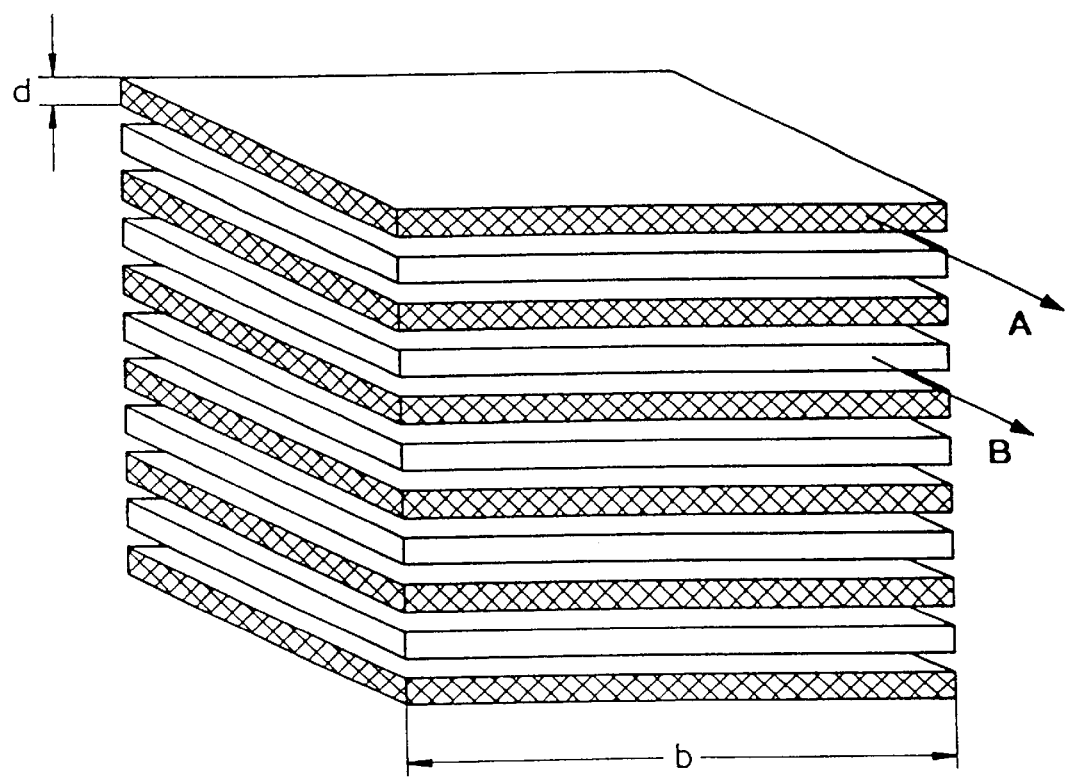
FIG. 2 shows a diagram of fluid lamellae lying one above the other

FIG. 2 shows the principle on which the invention is based, of fluid lamellae layered alternately one above the other. A lamella comprising fluid A is in each case followed by a lamella of fluid B. The thickness d of the lamellae here is small compared with their width b. Fluids A, B can consist of a gas or a liquid and are called educts A, B below.

Figure 3:
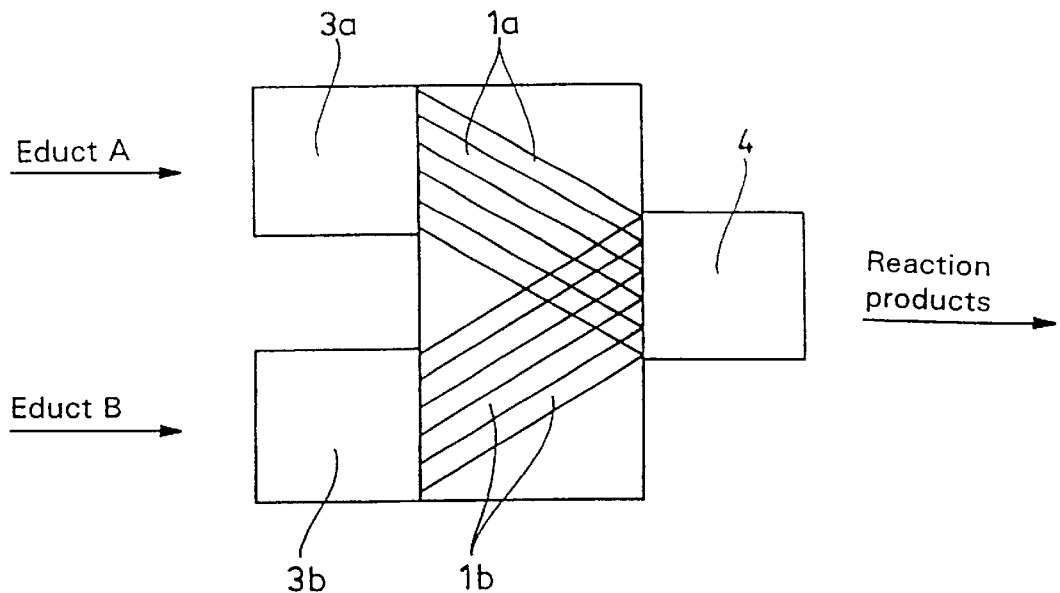
FIG. 3 shows the structure in principle of a preferred embodiment of the microstructure lamellae mixer for two educts A, B with symmetric flow paths.

FIG. 3 shows a diagram of an embodiment, corresponding to the device according to the invention, of a microstructure lamellae mixer or reactor. The construction principle of this mixer/reactor is based on various layers of the plates with microslit channels running at an angle being stacked vertically one above the other in a sandwich construction.

A plate with the microslit channels 1a is followed in each case by a plate with the microslit channels 1b, i.e. two plates arranged directly one above the other in the stack are in each case provided with a system of microslit channels 1a, 1b, the microslit channel systems of successive plates forming an angle α with respect to one another and being arranged symmetrically to the horizontal axis in FIG. 3, i.e. as mirror images to one another. The plates have, for example, a thickness of 100 μm. The slit channels have, for example, a depth d of 70 μm and a width b>700 μm.

The systems of microslit channels 1a running upwards at an angle, seen from the centre of the diagram in FIG. 3, open on the left into a distributor chamber 3a, to which a reactant or educt A can be fed. Analogously, the systems of microslit channels 1b running downwards at an angle open on the left into a distributor chamber 3b, to which an educt B (reactant) can be fed. The two systems of microslit channels open on the right-hand side, without crossing each other, into a common mixing/reaction space 4. The mirror-symmetry arrangement of the microslit channels 1a, 1b is not absolutely necessary. The microslit channels 1b, for example, can also have a different inclination towards the horizontal axis than the microslit channels 1a.

However, it is important that the microslit channels of a system are in each case the same as one another in terms of flow, i.e. that the microslit channels 1a all have the same flow resistance. The same condition applies to the flow resistance of the microslit channels 1b, but the flow resistances of the two microchannel systems 1a, 1b (in relation to one another) can be different. The same flow resistance can be achieved if the length and the cross-section of all the microslit channels 1a are the same.

Figure 4:
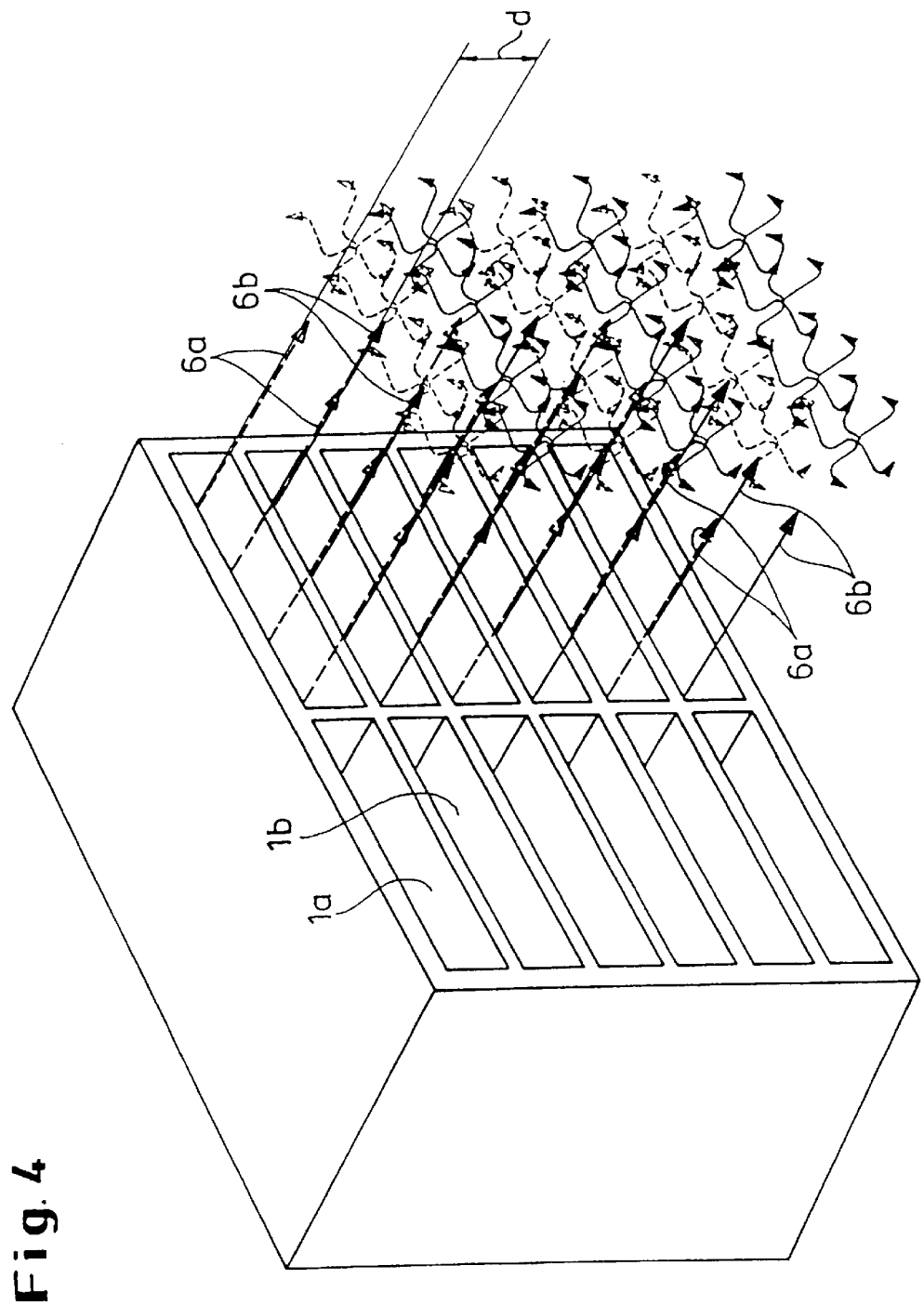
FIG. 4 shows the mixing of the fluid lamellae which are assigned to educts A, B and enter into the mixing or reaction space from the microstructure lamellae mixer.

The educt, for example a gaseous reactant, fed to a distributor chamber 3a, 3b, is in each case distributed among the microslit channels 1a, 1b. The two reactants are brought together on entry into the mixing/reaction space, and this operation is described in more detail below with the aid of FIGS. 4 and 5. FIG. 4 shows the opening cross-section of the microstructure lamellae mixer in perspective.

In the top layer or plate, for example, the microslit channels 1a assigned to educt A open, and in the subsequent layer or plate lying underneath, the microslit channels 1b of educt B open into the mixing/reaction space. A layer or plate with the microslit channels belonging to educt A again follows, and so on. FIG. 4 is also a diagram of how the fluid streams fed into the microslit channels enter as fluid lamellae 6a, 6b into the mixing/reaction space and mix with one another at an increasing distance from the opening. Mixing is effected here by diffusion and/or turbulence, while in the microslit channels as a rule laminar flow conditions prevail. At the same time as the mixing, the reaction of educts A, B also starts. The reaction product is removed at the end of the mixing/reaction space (cf. FIG. 3). FIG. 5 shows once again the spatial sequence in which educts A, B arrive at the opening cross-section in the mixing/reaction space. A layer with fluid lamellae of educt A thus in each case adjoins a layer of fluid lamellae of educt B. The arrangement can of course also be rotated through 90°, so that the layers lie side by side.

The microstructure lamellae mixer according to FIG. 3 can also be modified in that three or more educts are divided up in each case into separate systems of microslit channels, and are then brought together in the mixing/reaction space. One variant which is of interest in terms of process technology comprises a procedure in which the third educt consists of a temperature-controlled inert fluid. The fluid lamellae are then led in the microstructure lamellae mixer such that a fluid lamella of the temperature-controlled inert fluid is fed into the mixing/reaction space in the vicinity of a fluid lamella of an educt for heating or cooling purposes.

A practical embodiment of the microstructure lamellae mixer which has proved to be particularly suitable is described below with the aid of FIGS. 8a to 10b.

Foils 1 and 2 according to FIG. 8a have a thickness of 100 µm. Through foil type 1 passes one or a system of preferably parallel, closely adjacent microslit channels which run at an angle to the mixer longitudinal axis 3, have an acute angle +α with respect to this axis 3, starting from the left rear, and open in the central region of the front longitudinal side of the foil. An embodiment with in each case one microslit channel per foil is shown in FIG. 8a. A microslit channel 1b passes through foil type 2 in the same manner; however, in this case the angle between the longitudinal axis of the groove and the mixer longitudinal axis is -α; i.e. the microslit channel 1b runs from the rear right to the central region of the front longitudinal side of the foil. However, the angle does not have to have the same value. The microslit channels 1a, 1b can be incorporated, for example, with shaping diamonds and preferably have a width b>700 µm and a depth d of 70 µm. The thickness of the channel bases 5a, 5b is 30 µm.

In the case of wide microslit channels, it may be expedient for the foils or the channel bases 5a, 5b to be supported against one another by vertically arranged uninterrupted pins 15 or bridges of small transverse dimensions which are welded on to the channel bases. In this manner, the microslit channels 1a, 1b can be designed in any desired width without impairing the mechanical stability.

FIGS. 8b and 8c show how the foil types 1 and 2 are layered alternately one above the other, provided with an upper and a lower covering plate 7a, 7b and joined, for example, by means of diffusion welding to form a homogeneous, vacuum-tight and pressure-resistant microstructure body for the production of a guide component 6. These microslit channels 1a, 1b form a common block which has, for example, a square cross-section and a density of a few tens to a few hundreds of openings per cm², which adjoin the common mixing chamber 4. FIG. 8c shows the guide component 6, seen from the inflow side of fluids A and B. As can be seen from this and from the plan view according to FIG. 8d, the channels 1a, 1b which run at an angle to the longitudinal axis 3 diverge from the mixing chamber 4 alternately towards the fluid entry side, so that fluids A and B can be fed separately to the guide component 6 in each case via an entry chamber or distributor chamber 3a and 3b. After exit from the guide component 6, the fine fluid lamellae 6a, 6b of fluids A and B are mixed intimately with one another and form a common flow C in the mixing chamber 4 (see also FIG. 4).

FIGS. 9a and 9b show a variant in which intermediate foils 8 which have microslit channels 9 running perpendicularly to the longitudinal axis 3 for passing a cooling or heating medium through are inserted between two foil types 1 and 2 and between the foils and the cover plates 7a, 7b. The mixing time and the rate of reaction of fluids A and B can be influenced as a result.

Figure 10A:
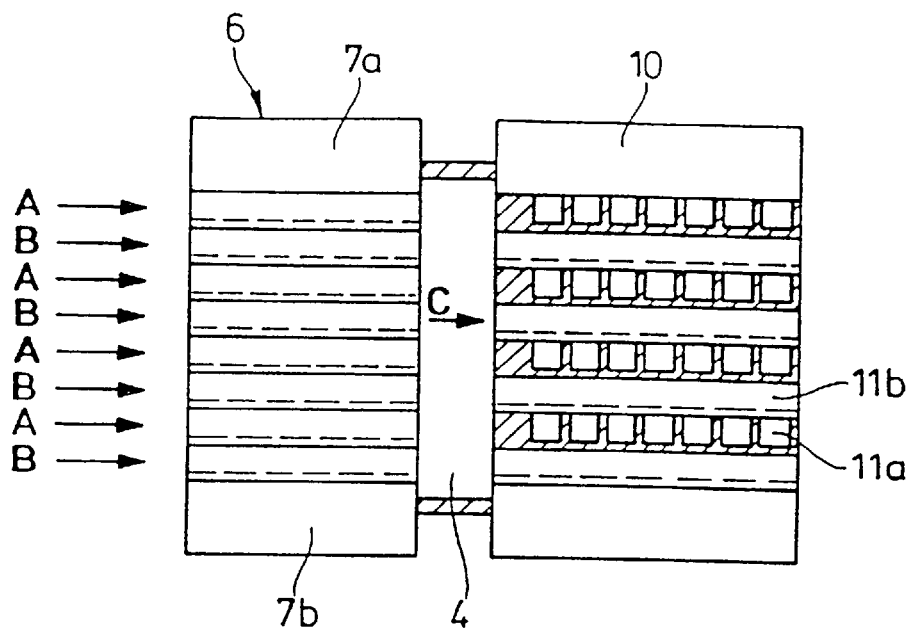
FIG. 10a shows a section through a microstructure lamellae mixer, to the mixing chamber of which a heat exchanger is connected

FIG. 10a shows a guide component 6 corresponding to FIGS. 8a to 8d in section, to which a mixing chamber 4 is connected. To this mixing chamber is connected a heat exchanger 10, through which, as in the variant according to FIGS. 9a and 9b, channels 11a running at right angles to the flow direction C pass, for removal or supply of the heat of reaction from or, respectively, to the channels 11b.

Figure 10B:
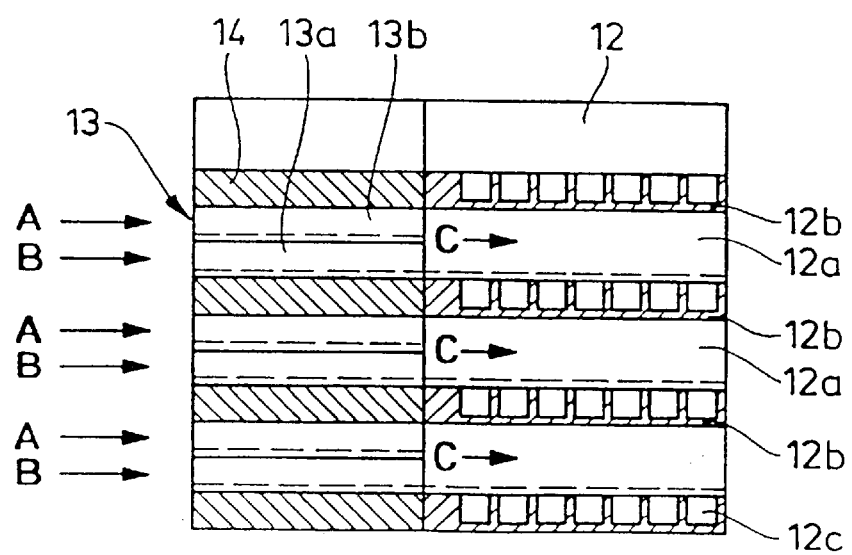
FIG. 10b shows a microstructure lamellae mixer with a mixing chamber constructed as a heat exchanger.

In FIG. 10b, the heat exchanger 12 is connected directly to the guide component 13. The arrangement here is made by spacer foils 14 such that in each case two channels 13a, 13b lying one above the other for fluids A, B in each case open out into a common mixing space portion 12a of the heat exchanger, these mixing space portions 12a adjoining foils 12b, which have channels 12c running at right angles to the flow direction C. These channels 12c carry a cooling or heating medium with which heat can be removed or supplied, with respect to the mixing and reaction zones 12a.

EXAMPLE

To evaluate the mixing properties of the most diverse mixer devices, the azo coupling reaction of α-naphthol with 4-sulphobenzenediazonium salt is employed in the literature [2, 8, 9]. This reaction corresponds to a reaction equation comprising the desired main reaction and an undesirable competing secondary reaction, in which the product formed via the main reaction reacts with unreacted educt to give an undesirable secondary product. The secondary product can be analysed in a simple manner with the aid of absorption spectra. The quality of the mixing operation is evaluated here by the selectivity of the undesirable secondary product S, $X_s$. The more S formed, the poorer the mixing.

Figure 6:
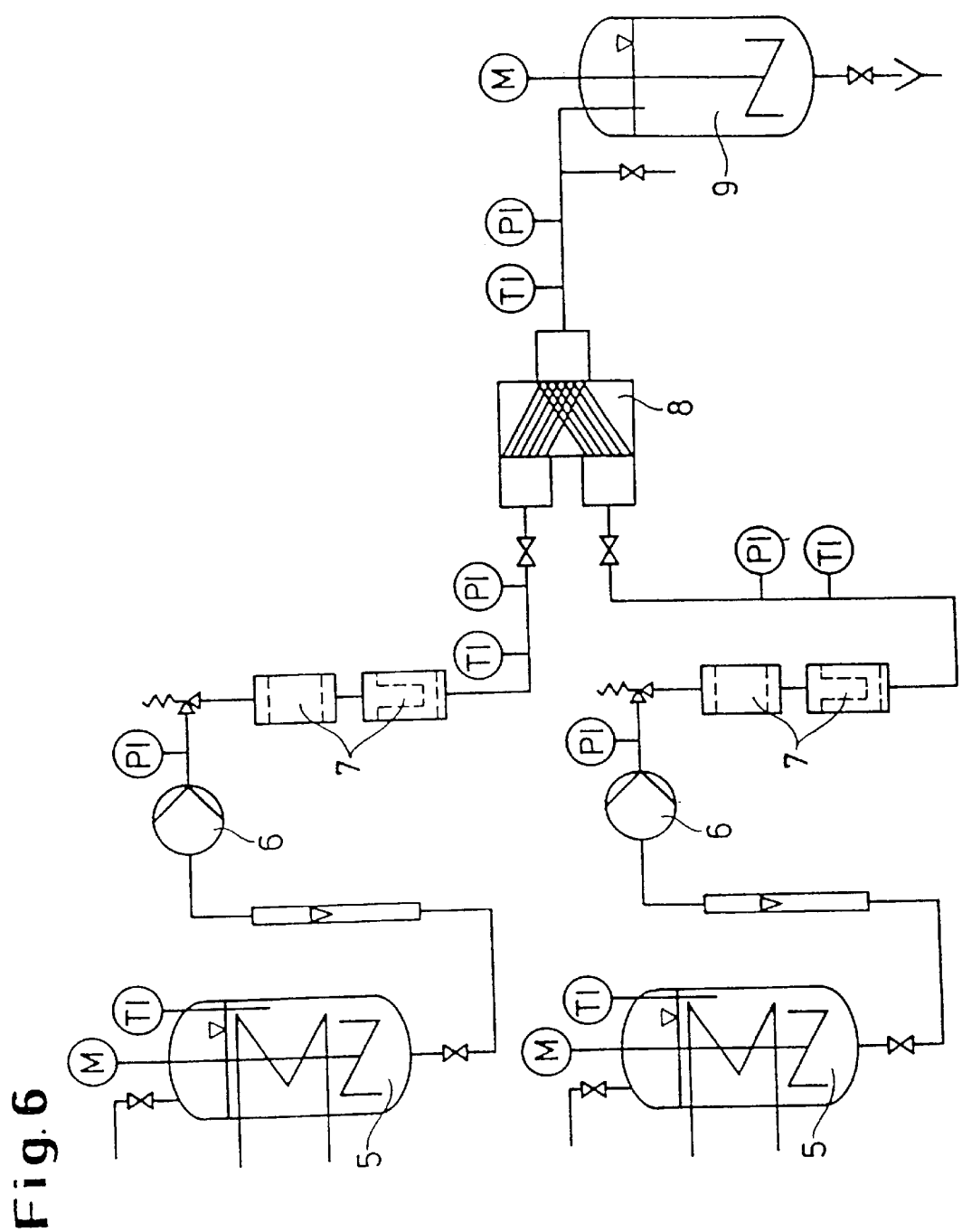
FIG. 6 shows a flow diagram for an apparatus for investigating chemical reactions which proceed using the device according to the invention

Investigations on carrying out rapid chemical reactions by means of microstructure mixing were carried out in the apparatus shown in FIG. 6. This comprises the reservoir tanks 5 for starting components A and B, the metering and regulating devices 6, filters 7 for protecting the microstructure mixer against blockages, the microstructure mixer 8 and the collecting tank 9 for the product mixture. The microstructure lamellae mixer has slit channels having a depth d of 70 µm and a width b of 4 mm. The microstructure lamellae mixer was compared in these investigations with a microstructure mixer having rectangular microchannels which generate free jets of width 100 µm and thickness 70 µm. A conventional smooth jet nozzle was furthermore included in the comparison. The jets in the two microstructure mixers were arranged such that components A and B emerged from the mixer in layers arranged alternately one above the other.

Volume flow ratios of $\alpha = V_A/V_B$ of 10 were established. Output parameters of $\Psi > 10^2$ were used. The reaction kinetics data and the specification for applying the model reactions are to be found in the literature [2, 8. 9, 10].

Figure 7:
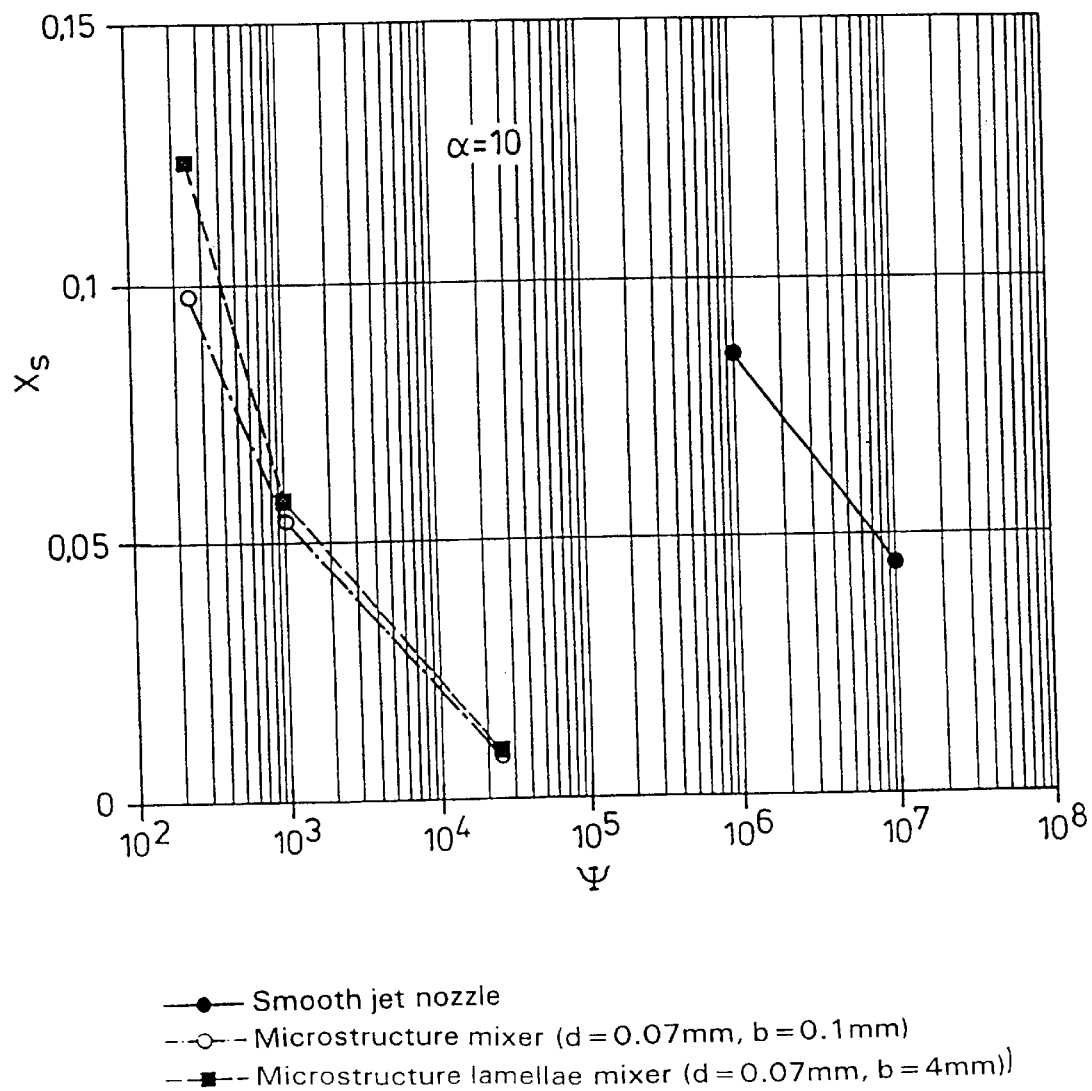
FIG. 7 shows results in the azo coupling reaction of α-naphthol with 4-sulphobenzenediazonium salt using a microstructure lamellae mixer, in comparison with a microstructure mixer with an approximately square channel cross-section and with a conventional and smooth jet nozzle reactor

A stoichiometric ratio of 1.05 and a constant naphthol starting concentration of 1.37 mol/m³ were established. The output parameter $\Psi$ is calculated as follows:

$$\Psi = (\Delta p_{Naph.} \cdot V_{Naph.} + \Delta p_{Sulph.} \cdot V_{Sulph.}) / \{k_2 \cdot c_{a0} \cdot \eta \cdot (V_{naph.} + V_{sulph.})\}$$

where
$\Delta p_{Naph.}$ collision loss of naphthol solution in the mixer
$\Delta p_{Sulph.}$ collision loss of sulphanilic acid solution in the mixer
$V_{Naph.}$ volume flow of naphthol solution
$V_{Sulph.}$ volume flow of sulphanilic acid solution
$k_2$ reaction rate constant of the undesirable secondary reaction
$c_{a0}$ starting concentration of naphthol
$\eta$ dyn. viscosity The selectivity of the undesirable secondary product $X_S$ is plotted against the output parameter $\Psi$ in FIG. 7.

It is found that for the volume flow ratio α=10 and the same output parameter, substantially less undesirable secondary product is formed when the microstructure lamellae mixer and microstructure mixer are employed than when a conventional smooth jet nozzle is used. This finding is completely surprising on the basis of the existing doctrine that the mixing intensity is determined solely by the output parameter and the substance data. The mixing properties of the microstructure lamellae mixer here are approximately equal to those of the microstructure mixer, substantial advantages of the microstructure lamellae mixer being that the frictional pressure loss is lower at least by a factor of 3 and a lower backmixing due to swirling at the entry into the mixing/reaction space occurs because of a lower number of fluid elements.

Literature

[1] Brodkey, R. S. (ed.) Turbulence in Mixing Operations Theory and Application to Mixing and Reaction Academic Press, Inc., New York, San Francisco, London, 1975
[2] Tebel, K. H.; May, H. -O. Der Freistrahlrohrreaktor—Ein effektives Reaktordesign zur Unterdrückung von Selektivitätsverlusten durch schnelle, unerwünschte Folgereaktionen [The Free Jet Tube Reactor—An Effective Reactor Design for Suppressing Selectivity Losses due to Rapid, Undesirable Secondary Reactions] Chem.-Ing.-Tech. MS 1708/88, Synopse [Synopsis] in Chem.-Ing.-Tech. 60, 1988
[3] Zehner, P.; Bittins. K. Düsenreaktoren [Nozzle Reactors] Fortschr. Verf. Technik 23, 1985, 373
[4] Tosun, G. A Study of Micromixing in T Mixers Ind. Eng. Chem. Res. 26, 1987, 1184
[5] Batchelor, G. K. Small-scale Variation of Convected Quantities Like Temperature in Turbulent Fluid J. Fluid Mech. 5, 1959, 1 13
[6] Baldyga, J.; Bourne, J. R. Micromixing in Inhomogeneous Turbulence Chem. Eng. Sci. 43, 1988, 107
[7] Schmidt, P.; Caesar, C. Mikroreaktor zur Durchführung chemischer Reaktionen mit starker Wärmetönung [Microreactor for Carrying Out Chemical Reactions With Intense Heat of Reaction] and Offenlegungsschrift DE 39 26 466 A 1
[8] Brodkey, R. S. Fundamentals of Turbulent Motion, Mixing and Kinetics Chem. Eng. Commun. 8, 1981, 1
[9] Bourne, J. R.; Hilber, C.; Tovstiga, G. Kinetics of the Azo Coupling Reactions Between 1-Naphthol and Diazotized Sulphanilic Acid; Chem. Eng. Commun. 37, 1985, 293
[10] Bourne, J. R.; Kozicki, F.; Rys, P. Mixing and Fast Chemical Reaction I: Test Reactions to Determine Segregation Chem. Eng. Sci. 36, 1981, 1643

What is claimed is:

1. A microstructure lamellae mixer having at least one mixing chamber and a guide component for supplying fluids to be mixed to the mixing chamber, the guide component being composed of several planar elements which are layered one above the other and which have at least one surface which comprises microchannels running at an angle with respect to the longitudinal axis of the mixer, the microchannels of adjacent elements crossing each other without contact and having outlets into the mixing chamber, and wherein:

a) the planar elements comprise foils into which in each case an individual or a system of adjacent microchannels oriented at alternating angles to the mixer longitudinal axis is incorporated, such that when the foils are layered one above the other, an individual or a series of closed microchannels for guiding fluids to be mixed are formed;

b) the microchannels have a depth of <1,000 μm, a width b which is at least 10 times the depth and a base wall thickness of <1,000 μm;

c) the openings of the microchannels adjoining the mixing chamber lie in line one above the other, the microchannels of adjacent foils diverging towards fluid inlets to the mixer such that the fluids to be mixed can be fed to separate inlets.

2. The microstructure lamellae mixer of claim 1, wherein the microchannels have bases that are supported at regular intervals by pins permanently connected to such bases.

3. The microstructure lamellae mixer of claim 1, wherein an intermediate foil is inserted between in each case two foils with the microchannels which diverge towards the fluid entry side, said intermediate foils having microchannels running perpendicularly to the longitudinal axis of the mixer, for passing a cooling or heating medium through.

4. The microstructure lamellae mixer of claim 1, wherein a micro-heat exchanger is connected to the mixing chamber.

5. The microstructure lamellae mixer of claim 1, wherein the mixing chamber is a micro-heat exchanger connected to the guide component.

* * * * *